3,056,305
STARTING MOTOR TRANSMISSION FOR INTERNAL COMBUSTION ENGINES OR THE LIKE
Heinrich Kochendörfer, Fellbach, Württemberg, Germany, assignor to Robert Bosch G.m.b.H., Stuttgart, Germany
Filed June 13, 1961, Ser. No. 116,713
Claims priority, application Germany June 18, 1960
9 Claims. (Cl. 74—7)

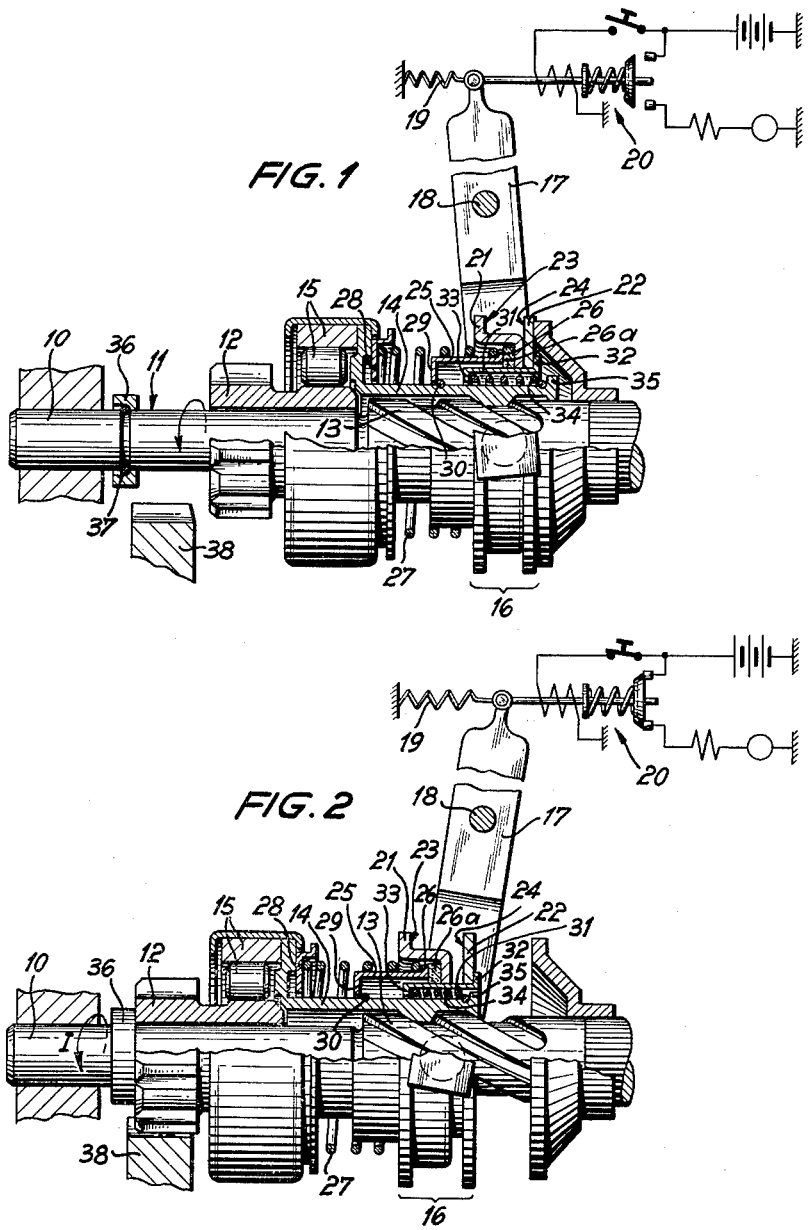

The present invention relates to starting motors adapted to be used with internal combustion engines or the like.

More particularly, the present invention relates to transmissions of such starting motors.

It is conventional in transmissions of this type to shift the movable assembly of the transmission along the starting motor drive shaft in one direction or the other by way of a sleeve which surrounds the assembly and which is acted upon by a shifting fork or the like. This sleeve conventionally includes a pair of ring members and a pair of springs are located on opposite sides of the ring members and urge them toward each other so that these springs extend in opposite directions away from the pair of ring members which form the shifting sleeve of the assembly. As a result of this construction the entire assembly is undesirably long and requires an undesirably large amount of space in order to be properly accommodated.

One of the objects of the present invention is to provide a starting motor transmission assembly which is exceedingly compact, as compared to conventional assemblies of this type, so that it requires but a fraction of the space normally required for conventional assemblies of this type.

Another object of the present invention is to provide a structure where the springs which urge the elements of the shifting sleeve toward each other are nevertheless housed or surrounded one by the other and extend in the same direction from the pair of elements which form the shifting sleeve so that it is possible to provide an extremely short assembly with the invention.

Still another object of the present invention is to provide a structure of the above type which while being extremely compact is nevertheless extremely simple and rugged and operates very efficiently.

With the above objects in view the invention includes, in a starting motor transmission, a rotary starting motor drive shaft and a pinion surrounding this shaft and being axially slidable as well as freely rotatable thereon. A hollow shaft also surrounds the drive shaft, and an overrunning clutch means interconnects the pinion and the hollow shaft. A screw means interconnects the hollow shaft and the motor shaft. A sleeve means surrounds the hollow shaft and includes a pair of annular members, and a shifting means extends between the pair of annular members of the sleeve means so as to move the sleeve means in one direction or the other along the shafts. In accordance with the present invention a pair of spring means cooperate with the pair of annular members of the sleeve means to urge these annular members toward each other, and the pair of spring means of the invention are so arranged that one of the spring means is surrounded at least in part by the other of the spring means and both spring means extend in the same directions from the pair of annular members, so that in this way an exceedingly compact assembly is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows a transmission according to the present invention in a rest position; and FIG. 2 shows the structure of FIG. 1 when it has been shifted to an operative position for starting an internal combustion engine or the like.

Referring now to FIG. 1, there is fragmentarily illustrated therein the starting motor drive shaft 10, the remainder of the starting motor being omitted from the drawings. This motor shaft 10 is supported by suitable bearings for rotation about its own axis, and it has a section 11 provided with a smooth outer cylindrical surface. A pinion 12 surrounds this section 11 so that the pinion 12 is freely slidable both axially and circumferentially with respect to the motor shaft 10. A section of the shaft 10 located to the right of the section 11 thereof, as viewed in the drawings, forms a screw portion 13 of relatively large pitch and having a multiple thread, as shown in the drawings. A hollow shaft 14 surrounds the motor shaft 10 and is provided at its inner surface with projecting thread portions received in the threads of the screw portion 13, so that in this way there is provided a screw means which interconnects the hollow shaft 14 with the motor shaft 10. An overrunning clutch means 15 interconnects the pinion 12 with the hollow shaft 14 so that the elements 12, 15, and 14 are all axially shiftable as a unit along the motor shaft 10. A sleeve means 16 surrounds the hollow shaft 14, and this sleeve means 16 includes a pair of annular members 21 and 22 having outer peripheral portions 23 and 24, respectively, which are always spaced from each other. A shifting means extends into the space between the outer peripheral portions 23 and 24 of the annular members 21 and 22 of the sleeve means 16 for shifting the sleeve means 16 in one direction or the other along the axis of the shaft 10, and in this way, in a manner described below, the entire transmission assembly will be shifted in one direction or the other along the motor drive shaft 10. The shifting means takes the form of a shifting fork lever 17 pivotal about a stationary pivot 18 and having, as is conventional, a pair of arms extending partway around the sleeve 16 and carrying projections which extend into the space between the outer peripheral portions 23 and 24 of the annular members 21 and 22. A spring 19 cooperates with the shifting means 17 to urge the latter to a rest position determined by engagement of the annular member 22 with the frustoconical annular member shown at the right of the drawings fixed to the shaft 10 just to the right of the threaded portion 13 thereof, so that the movement of the member 22 to the right, as viewed in the drawings, by the spring 19 is limited in this way. A magnetic switch assembly 20 which is of a conventional structure acts as a solenoid when energized to turn the shifting means 17 about the pivot 18 in a clockwise direction, as viewed in the drawings, in opposition to the spring 19. As is shown diagrammatically in the upper right portions of FIGS. 1 and 2 there is a switch in the electrical circuit which is closed when the starter is operated, as is conventional, and upon closing of this switch the solenoid or magnetic switch assembly 20 will be energized to turn the shifting means 17 from the position of FIG. 1 to that of FIG. 2. The starting motor itself is shown diagrammatically at the upper right portions of FIGS. 1 and 2 directly beneath the battery which is illustrated in the drawings, and it will be noted that the circuit to the starting motor itself is not completed until after the shifting means 17 has been turned through a predetermined angle, so that, as will be apparent from the description which follows, the transmission assembly is first shifted to the left, as viewed in FIGS. 1 and 2, through a predetermined distance before the starting motor drive shaft 10 starts to turn.

A pair of spring means, one of which is located within the other, respectively cooperate with the annular members 21 and 22 of the sleeve means 16 for urging these annular members toward each other, and this pair of spring means both extend in the same direction from the pair of annular members 21 and 22. The pair of spring means include the pair of tubular members 25 and 31. It will be noted that the tubular member 31 extends within the tubular member 25. At the ends of the tubular members 25 and 31 which are nearest to the overrunning clutch means 15, these tubular members 25 and 31 are respectively provided with inwardly directed flanges 29 and 33. At their opposite ends which are most distance from the overrunning clutch means 15 the pair of elongated tubular members 25 and 31 are respectively provided with outwardly directed annular flanges 26 and 32. The spring means which includes the tubular member 25 also includes the coil spring 27 which bears at one end against the outwardly directed annular flange 26 of the outer tubular member 25 and which bears at its opposite end against a washer 28 which in turn bears against the overrunning clutch means 15 to form with the right wall of the latter, as viewed in the drawings, a stop means through which spring 27 acts on shaft 14. A non-metallic friction ring 26a is located between and engages the flange 26 and the inner peripheral portion of the annular member 21. Thus, it will be seen that the spring means 25, 27 which cooperates with the annular member 21 urges this annular member 21 away from the overrunning clutch means 15. A means is provided to limit movement of the tubular member 25 away from the overrunning clutch means 15, and this means takes the form of a snap ring 30 which is received in an annular groove formed in the exterior of the hollow shaft 14 and which extends from the exterior surface of the hollow shaft 14 by a distance greater than the distance between the inner periphery of the flange 29 and the hollow shaft 14, this flange 29 being located to the left of the snap ring 30, so that in this way the snap ring 30 acts as a stop to limit the movement of the sleeve or tube 25 to the right, as viewed in FIGS. 1 and 2, with respect to the hollow shaft 14. It will be noted from both positions of the assembly shown in FIGS. 1 and 2 that the spring 27 serves to maintain the stop 30 in engagement with the flange 29. Thus, as the shifting means 17 turns from the position of FIG. 1 to that of FIG. 2 it moves the sleeve element 21 initially toward the left, as viewed in FIGS. 1 and 2, and because the spring 27 maintains the snap ring 30 against the flange 29 the entire assembly will move with the annular member 21 of the sleeve means 16. The outer or outwardly directed flange 32 of the inner tubular member 31 engages the inner peripheral portion of the annular member 22 of the sleeve means 16, and it will be noted that the annular member 21 has a stepped cross-section so that its inner periphery is located closer to the annular member 22 than the outer peripheral portion 23 of the annular member 21. Thus, these outer peripheral portions 23 and 24 of the annular members 21 and 22, respectively, are always spaced from each other to provide a space for receiving the portions of the shifting means 17 which act on the sleeve means 16. The second spring means which includes the tubular member 31 also includes a coil spring 34 which bears at its right end, as viewed in FIGS. 1 and 2, against a collar or annular projection 35 of the hollow shaft 14 and at its left end, as viewed in the drawings, against the inwardly directed flange 33 of the tubular member 31, so that the spring 34 urges the tubular member 31 and of course the annular member 22 to the left, as viewed in FIGS. 1 and 2. Thus, the collar or annular projection 35 forms a stop means carried by the hollow shaft 14 and through which the spring 34 acts on the shaft 14. The spring 27 is substantially stronger than the spring 34 so that when the parts are at rest they will have the position illustrated in FIG. 1, and it should be noted that the spring 34 also is weaker than the spring 19. The movement of the entire shiftable assembly is limited by a stop ring 36 which surrounds and is carried by shaft 10 and which is limited in its movement to the left, as viewed in the drawings, by a snap ring 37 which is located within a groove of the shaft 10 and which cooperates with the inner peripheral portion of the stop ring 36 in a manner shown most clearly in FIG. 1. The pinion 12 cooperates in a known way with the toothed peripheral portion 38 of the flywheel of the internal combustion engine.

In order to set the starting motor transmission into operation the magnetic switch assembly is energized in a purely conventional manner well-known in the art, and as a result shifting means 17 is turned from the position of FIG. 1 to that of FIG. 2. During this turning of the shifting means 17 the entire transmission is shifted along the shaft 10 toward but not all the way up to the stop ring 36. As was mentioned above the starting motor does not start to operate until after the transmission assembly has been shifted through a predetermined distance. Thus, during this initial phase of the operation the shiftable assembly will move to the left along the shaft 10 from the position of FIG. 1 toward that of FIG. 2 and of course the hollow shaft 14 will turn with respect to the threads 13. After the shifting means 17 has turned to a predetermined angle the circuit of the starting motor will be closed and the shaft 10 will now start to turn in the direction I indicated in the drawings, and as a result the threaded portion 13 of the shaft 10 will cooperate with the hollow shaft 14 to urge the latter further to the left until the parts assume the position indicated in FIG. 2 where the pinion 12 not only meshes with the geared periphery 38 of the flywheel but also engages the stop ring 36. Inasmuch as the shafting means 17 cannot turn beyond the position shown in FIG. 2 it prevents the annular member 22 and the tubular member 31 from moving together with the other elements and as a result the spring 34 is compressed from its position as shown in FIG. 1 to that shown in FIG. 2, while the advancing of the hollow shaft 14 to the left of course takes with it the tubular member 25 and the annular member 21 of the sleeve means 16.

When the operator releases the switch of the starting motor assembly so as to deenergize the magnetic switch 20 the spring 19 returns the shafting means 17 from the position of FIG. 2 to that of FIG. 1, and this will of course result in movement of the annular member 22 together with the tubular member 31 to the position shown in FIG. 1. The springs 19 and 34 at this time cooperate to move the entire assembly back from the position of FIG. 2 to that of FIG. 1.

Inasmuch as the tubular member 31 extends into the tubular member 25 and the spring 27 surrounds at least part of the spring 34, and inasmuch as both of the spring means 25, 27 and 31, 34 extend in the same directions from the pair of annular members 21 and 22, the entire length of the assembly is extremely short as compared to conventional constructions so that an extremely compact assembly is provided and the amount of space required for the entire starting motor assembly can be maintained extremely small, as compared to conventional assemblies.

It will be understood that each of the elements described above, or two or more together, may also find a useful application in other types of starting motors differing from the types described above.

While the invention has been illustrated and described as embodied in transmissions of starting motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a starting motor transmission for internal combustion engines or the like, in combination, a starting motor drive shaft; a pinion surrounding said shaft and being axially slidable as well as rotatable with respect thereto; a hollow shaft through which said motor shaft extends; overrunning clutch means interconnecting said pinion and hollow shaft; screw means interconnecting said hollow shaft and motor shaft; sleeve means surrounding said hollow shaft and including a pair of annular members; shifting means extending between said annular members of said sleeve means for urging the latter in one direction or the other axially of said shafts; a pair of stop means spaced from each other longitudinally of and carried by said hollow shaft, said pair of stop means being axially immovable with respect to said hollow shaft; and a pair of spring means respectively acting on said pair of stop means and cooperating with said pair of annular members for urging the same toward each other, said pair of spring means acting respectively through said pair of stop means on said hollow shaft for transmitting movement of one or the other of said annular members to said hollow shaft, one of said spring means surrounding the other of said spring means.

2. In a starting motor transmission for internal combustion engines or the like, in combination, a starting motor drive shaft; a pinion surrounding said shaft and being axially slidable as well as rotatable with respect thereto; a hollow shaft through which said motor shaft extends; overrunning clutch means interconnecting said pinion and hollow shaft; screw means interconnecting said hollow shaft and motor shaft; sleeve means surrounding said hollow shaft and including a pair of annular members; shifting means extending between said annular members of said sleeve means for urging the latter in one direction or the other axially of said shafts; a pair of stop means spaced from each other longitudinally of and carried by said hollow shaft, said pair of stop means being axially immovable with respect to said hollow shaft; and a pair of spring means respectively acting on said pair of stop means and cooperating with said pair of annular members for urging the same toward each other, said pair of spring means acting respectively through said pair of stop means on said hollow shaft for transmitting movement of one or the other of said annular members to said hollow shaft, one of said spring means surrounding the other of said spring means and said pair of spring means respectively extending in the same directions from said pair of annular members along said hollow shaft.

3. In a starting motor transmission for internal combustion engines or the like, in combination, a rotary starting motor shaft; a pinion through which said shaft extends, said pinion being freely turnable with respect to and axially slidable with respect to said motor shaft; a hollow shaft through which said motor shaft extends; overrunning clutch means interconnecting said pinion with said hollow shaft; screw means interconnecting said hollow shaft and motor shaft; sleeve means surrounding said hollow shaft and including a pair of annular members having outer peripheral portions which are spaced from each other; a pair of coil springs surrounding said hollow shaft with one of said coil springs at least partly surrounding the other; a pair of stop means spaced longitudinally of and carried by said hollow shaft, said pair of stop means being axially immovable with respect to said hollow shaft and said pair of coil springs respectively acting through said pair of stop means on said hollow shaft; first tubular means surrounding said hollow shaft and cooperating with one of said coil springs for transmitting the force thereof to that one of said annular members which is nearest to said overrunning clutch means; and second tubular means surrounding said hollow shaft and transmitting the force of the other of said springs to the other of said annular members, one of said tubular means extending partly into the other and said springs and first and second tubular means cooperating with said annular members for urging the same toward each other.

4. In a starting motor transmission for internal combustion engines or the like, in combination, a rotary starting motor shaft; a pinion through which said shaft extends, said pinion being freely turnable with respect to and axially slidable with respect to said motor shaft; a hollow shaft through which said motor shafts extends; overrunning clutch means interconnecting said pinion with said hollow shaft; screw means interconnecting said hollow shaft and motor shaft; sleeve means surrounding said hollow shaft and including a pair of annular members having outer peripheral portions which are spaced from each other; a pair of coil springs surrounding said hollow shaft with one of said coil springs at least partly surrounding the other; a pair of stop means spaced longitudinally of and carried by said hollow shaft, said pair of stop means being axially immovable with respect to said hollow shaft and said pair of coil springs respectively acting through said pair of stop means on said hollow shaft; first tubular means surrounding said hollow shaft and cooperating with one of said coil springs for transmitting the force thereof to that one of said annular members which is nearest to said overrunning clutch means; second tubular means surrounding said hollow shaft and transmitting the force of the other of said springs to the other of said annular members, one of said tubular means extending partly into the other and said springs and first and second tubular means cooperating with said annular members for urging the same toward each other; and an annular non-metallic friction member interposed between said first tubular means and the annular member of said sleeve means which is nearest to said overrunning clutch means.

5. In a starting motor transmission for internal combustion engines or the like, in combination, a rotary starting motor shaft; a pinion through which said shaft extends, said pinion being freely turnable with respect to and axially slidable with respect to said motor shaft; a hollow shaft through which said motor shaft extends; overrunning clutch means interconnecting said pinion with said hollow shaft; screw means interconnecting said hollow shaft and motor shaft; sleeve means surrounding said hollow shaft and including a pair of annular members having outer peripheral portions which are spaced from each other; a pair of coil springs surrounding said hollow shafts with one of said coil springs at least partly surrounding the other; a pair of stop means spaced longitudinally of and carried by said hollow shaft, said pair of stop means being axially immovable with respect to said hollow shaft and said pair of coil springs acting on said pair of stop means, respectively, and through said pair of stop means on said hollow shaft; first tubular means surrounding said hollow shaft and cooperating with one of said coil springs for transmitting the force thereof to that one of said annular members which is nearest to said overrunning clutch means; and second tubular means surrounding said hollow shaft and transmitting the force of the other of said springs to the other of said annular members, one of said tubular means extending partly into the other and said springs and first and second tubular means cooperating with said annular members for urging the same toward each other, said first tubular means and the spring which cooperates therewith urging said annular member nearest to said overrunning clutch means along said hollow shaft away from said clutch means; and means carried by said hollow shaft and cooperating with said first tubular means for limiting the movement of the latter away from said overrunning clutch means.

6. In a starting motor transmission for internal combustion engines or the like, in combination, a rotary motor drive shaft; a pinion through which said shaft extends, said pinion being axially slidable and freely rotatable with respect to said motor shaft; a hollow shaft through which said motor shaft extends; overrunning clutch means interconnecting said pinion and hollow shaft; screw means interconnecting said hollow shaft and motor shaft; a pair of tubular members surrounding said hollow shaft and located one at least partly within the other, said tubular members each having at one end a flange extending toward said hollow shaft and at its opposite end a flange extending away from said hollow shaft; sleeve means surrounding said hollow shaft and including a pair of annular members respectively having inner peripheral portions located between said flanges which are directed away from said hollow shaft and outer peripheral portions which are spaced from each other; shifting means extending into the space between said outer peripheral portions of said annular members for shifting said sleeve means axially of said shafts; a pair of stop means spaced longitudinally of and carried by said hollow shaft, said pair of stop means being axially immovable with respect to said hollow shaft; and a pair of coil springs respectively acting through said pair of stop means on said hollow shaft and respectively urging said tubular members in opposed directions which urge said outwardly directed flanges thereof toward each other so that said tubular members transmit the forces of said springs to said annular members to urge the latter toward each other, one of said springs being located within the other.

7. In a starting motor transmission for internal combustion engines or the like, in combination, a rotary motor drive shaft; a pinion through which said shaft extends, said pinion being axially slidable and freely rotatable with respect to said motor shaft; a hollow shaft through which said motor shaft extends; overrunning clutch means interconnecting said pinion and hollow shaft; screw means interconnecting said hollow shaft; a pair of tubular members one of which extends within the other, said tubular members respectively having at their ends which are nearest to said clutch means inwardly directed annular flanges and at their ends which are most distant from said clutch means outwardly directed annular flanges; a first spring located at one end adjacent said clutch means and engaging with its opposite end the outwardly directed flange of that tubular member which is nearest to said clutch means, said clutch means preventing axial movement of said one end of said first spring relative to said hollow shaft so that said first spring acts through said clutch means on said hollow shaft; a second spring engaging an end of said hollow shaft which is distant from said clutch means and also engaging the inwardly directed flange of the tubular member most distant from said clutch means for urging the latter tubular member toward said clutch means, whereby said springs urge said tubular members in directions where said outwardly directed flanges thereof move toward each other; stop means carried by said hollow shaft and cooperating with the inwardly directed flange of the tubular member nearest to said clutch means for limiting the movement of the latter member away from said clutch means; sleeve means including a pair of annular members respectively having inner peripheral portions locating between said outwardly directed flanges and outer peripheral portions spaced from each other; and shifting means extending into the space between said outer peripheral portions of said sleeve means for urging said sleeve means in one direction or the other along said shafts.

8. In a starting motor transmission for internal combustion engines or the like, in combination, a rotary starting motor drive shaft; a pinion through which said shaft extends, said pinion being freely movable both axially and circumferentially with respect to said drive shaft; an elongated hollow shaft through which said drive shaft extends; overrunning clutch means interconnecting said pinion and hollow shaft; screw means interconnecting said hollow shaft and motor shaft; an outer tubular member surrounding said hollow shaft and an inner tubular member extending partly within said outer tubular member, said tubular members respectively having at their ends nearest to said overruning clutch means inwardly directed annular flanges and at their ends which are distant from said clutch means outwardly directed annular flanges; an inner coil spring surrounding said hollow shaft and surrounded by said inner tubular member, said inner coil spring having one end engaging the inwardly directed flange of said inner tubular member; means carried by said hollow shaft and engaging the opposite end of said inner spring, whereby said inner spring urges said inner tubular member toward said overrunning clutch means; an outer coil spring engaging said overrunning clutch means and surrounding said outer tubular member and engaging said outwardly directed flange thereof so that said outer coil urges said outer tubular member away from said overrunning clutch means; means carried by said hollow shaft and cooperating with said inwardly directed flange of said outer tubular member for limiting the movement of the latter away from said overrunning clutch means; sleeve means including a pair of annular members respectively having inner peripheral portions extending between said outwardly directed flanges of said tubular members and outer peripheral portions spaced from each other, whereby said springs and tubular members cooperate to urge said annular members toward each other; and shifting means extending into the space between said outer peripheral portions of said annular members for moving said sleeve means in one direction or the other along said shafts.

9. In a starting motor transmission for internal combustion engines or the like, in combination, a rotary starting motor drive shaft; a pinion through which said shaft extends, said pinion being freely movable both axially and circumferentially with respect to said drive shaft; an elongated hollow shaft through which said drive shaft extends; overrunning clutch means interconnecting said pinion and hollow shaft; screw means interconnecting said hollow shaft and motor shaft; an outer tubular member surrounding said hollow shaft and an inner tubular member extending partly within said outer tubular member, said tubular members respectively having at their ends nearest to said overrunning clutch means inwardly directed annular flanges and at their ends which are distant from said clutch means outwardly directed annular flanges; an inner coil spring surrounding said hollow shaft and surrounded by said inner tubular member, said inner coil spring having one end engaging the inwardly directed flange of said inner tubular member; means carried by said hollow shaft and engaging the opposite end of said inner spring, whereby said inner spring urges said inner tubular member toward said overrunning clutch means; an outer coil spring engaging said overrunning clutch means and surrounding said outer tubular member and engaging said outwardly directed flange thereof so that said outer coil urges said outer tubular member away from said overrunning clutch means; means carried by said hollow shaft and cooperating with said inwardly directed flange of said outer tubular member for limiting the movement of the latter away from said overrunning clutch means; sleeve means including a pair of annular members respectively having inner peripheral portions extending between said outwardly directed flanges of said tubular members and outer peripheral portions spaced from each other, whereby said springs and tubular members cooperate to urge said annular members toward each other; shifting means extending into the space between said outer peripheral portions of said annular members for moving said sleeve means in one direction or the other along said shafts; and a non-metallic friction ring located between said outwardly directed flange of said outer tubular member and the inner peripheral portion of that annular member of said sleeve means which is nearest to said overrunning clutch means.

References Cited in the file of this patent

UNITED STATES PATENTS 2,939,323    Kochendörfer _____ June 7, 1960

FOREIGN PATENTS 532,835    Great Britain _____ Jan. 31, 1941
190,743    Austria _____ Aug. 15, 1956